(12) United States Patent
Dodds

(10) Patent No.: US 9,375,816 B2
(45) Date of Patent: Jun. 28, 2016

(54) AUTO CHANGER SPINDLE MOUNTING ASSEMBLY ADAPTED TO DRILL TAP MACHINES

(75) Inventor: Kemma Samuel Dodds, North Lauderdale, FL (US)

(73) Assignee: Air Turbine Technology, Inc., Boca Raton, FL (US)

(*) Notice: Subject to any disclaimer, the term of this patent is extended or adjusted under 35 U.S.C. 154(b) by 777 days.

(21) Appl. No.: 13/546,089

(22) Filed: Jul. 11, 2012

(65) Prior Publication Data

US 2014/0018219 A1    Jan. 16, 2014

(51) Int. Cl.
*B23C 9/00* (2006.01)
*B23Q 1/00* (2006.01)
*B23Q 3/157* (2006.01)

(52) U.S. Cl.
CPC .............. *B23Q 1/0036* (2013.01); *B23C 9/005* (2013.01); *B23Q 3/15706* (2013.01); *B23Q 2220/008* (2013.01); *Y10T 409/30448* (2015.01); *Y10T 409/309296* (2015.01); *Y10T 483/1707* (2015.01); *Y10T 483/1738* (2015.01)

(58) Field of Classification Search
CPC ............. Y10T 409/30448; Y10T 409/309296; B23C 9/005; B23Q 1/0036
USPC ................................................. 409/144, 230
See application file for complete search history.

(56) References Cited

U.S. PATENT DOCUMENTS

| | | | | |
|---|---|---|---|---|
| 3,874,411 A * | 4/1975 | Vik | ........................... | 137/614.06 |
| 4,164,879 A * | 8/1979 | Martin | ............................. | 82/158 |
| 4,392,761 A * | 7/1983 | Eckle | ............................... | 408/59 |
| 4,557,643 A * | 12/1985 | Cioci | ............................. | 409/136 |
| 4,571,129 A | 2/1986 | Strand | | |
| 4,578,003 A * | 3/1986 | Eckle | ............................... | 408/56 |
| 4,598,617 A * | 7/1986 | Kubo et al. | ...................... | 82/158 |
| 4,648,759 A * | 3/1987 | Ebenhoch | ........................ | 408/59 |
| 4,652,189 A * | 3/1987 | Mizoguchi | ..................... | 409/136 |
| 4,764,062 A * | 8/1988 | Hunt | .............................. | 409/136 |
| 4,795,293 A * | 1/1989 | Mizoguchi | ..................... | 409/136 |
| 4,992,012 A * | 2/1991 | Cioci | ............................. | 409/136 |
| 6,183,172 B1 * | 2/2001 | Shoda | ............................. | 408/36 |
| 6,939,094 B2 * | 9/2005 | Konishi | ......................... | 409/230 |
| 7,293,943 B1 * | 11/2007 | Matsumura et al. | ........... | 409/136 |
| 7,727,132 B2 | 6/2010 | Bahr | | |
| 2009/0060673 A1 | 3/2009 | Mace | | |

OTHER PUBLICATIONS

International Search Report and Written Opinion dated Dec. 12, 2013 received for PCT application No. PCT/US2013/049998.

* cited by examiner

*Primary Examiner* — Erica E Cadugan
*Assistant Examiner* — Michael Vitale
(74) *Attorney, Agent, or Firm* — Jon Gibbons; Fleit Gibbons Gutman Bongini & Bianco PL

(57) ABSTRACT

Described is a novel spindle mounting assembly for use with a computer numeric controlled (CNC) machine, such as a drill tap machine. In one example an auto changer spindle mounting assembly includes a collar with a gas inlet. The collar defines a collar opening therethrough to create a passage between the first side of the collar with the second side of the collar. The collar further includes a passage in fluid communication between the gas inlet and through a nipple to the collar opening. The mounting assembly includes a manifold body with a gas outlet adapted to mate with the gas inlet of the collar, the manifold body defined a passage in fluid communications between, the gas outlet and a manifold body inlet. Also included is at least one extension bar, adapted to mechanically fasten to the manifold body to a computer controlled machine.

6 Claims, 5 Drawing Sheets

FIG. 7

LOCK SCREW INSIDE THE NIPPLE OPENING TO SECURE THE SPINDLE TO THE MOUNTING COLLAR

AUTO CHANGER SPINDLE MOUNTING ASSEMBLY ADAPTED TO DRILL TAP MACHINES

FIELD OF THE INVENTION

This disclosure relates generally to machining processes and more specifically to an apparatus and method for machining.

BACKGROUND

Computer Numerical Control (CNC) machines are utilized in machining processes, and utilize a computer controller that typically reads G-code instructions for driving a powered mechanical device that is used to fabricate metal components by the selective removal of metal. CNC can do numerically directed interpolation of a cutting tool in the work envelope of a machine.

The powered mechanical device is often a pneumatic tool (e.g., a drill) that is fitted for coupling with the CNC machine, such as by insertion into and withdrawal from a CNC machine. The pneumatic tools or spindles can be manually coupled with the CNC machine or an automatic tool changer can be utilized.

Some tools are available from a CNC tool magazine, but require that the machine be stopped after change-over so that suitable power connections can be established with the tool. Other tools are pre-connected to the pneumatic source, but must be manually engaged with the CNC machine. Thus, CNC machines are typically programmed to stop prior to the normal machining cycle to permit manual tool installation or creation of a suitable power link with the tool after coupling with the machine.

Accordingly, there is a need for an apparatus and method for machining that facilitates the tool exchanging process. There is a further need for such an apparatus and method that provides flexibility to use various types of tools.

SUMMARY

An apparatus and method for machining is provided. The features of the examples described herein can allow for machining while facilitating the tool exchanging process. These features can also provide flexibility to use various types of tools with the CNC machine or other control device.

Described is a novel spindle mounting assembly for use with a computer numeric controlled (CNC) machine, such as a drill tap machine. In one example an auto changer spindle mounting assembly includes a collar with a gas inlet. The collar defines a collar opening therethrough to create a passage between the first side of the collar with the second side of the collar. The collar further includes a passage in fluid communication between the gas inlet and through a nipple to the collar opening. The mounting assembly includes a manifold body with a gas outlet adapted to mate with the gas inlet of the collar, the manifold body defined a passage in fluid communications between, the gas outlet and a manifold body inlet. Also included is at least one extension bar, adapted to mechanically fasten to the manifold body to a computer controlled machine.

The auto changer spindle mounting assembly may include a check valve adapted to allow a gas to pass into the gas inlet above a given pressure. Further, to fasten to the CNC machine, the extension bar includes a mounting plate with one or more openings therethrough adapted to accept fasteners. For example, the extension bar, further comprises one or more threaded openings and the mounting plate includes a corresponding number of openings therethrough adapted to accept fasteners for fastening to the mounting plate to the extension bar.

The above-described and other features and advantages of the present disclosure will be appreciated and understood by those skilled in the art from the following detailed description, drawings, and appended claims.

BRIEF DESCRIPTION OF THE DRAWINGS

The FIG. 1 is perspective view of an exemplary machining system according to an embodiment of the present invention;

FIG. 7 is a description of the lock screw.

DETAILED DESCRIPTION OF THE INVENTION

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having" as used herein, are defined as comprising (i.e. open language). The term "coupled" as used herein, is defined as "connected" although not necessarily directly, and not necessarily mechanically.

The term "air" is intended to broadly cover many different types of fluids, including oil mixed with air. Various materials or combinations of materials can be used to construct the mounting collar assembly and its components. For example, materials such as metals, alloys, composites, plastics, ceramics, and other inorganic or organic materials or combinations thereof may be used.

Figure 1:
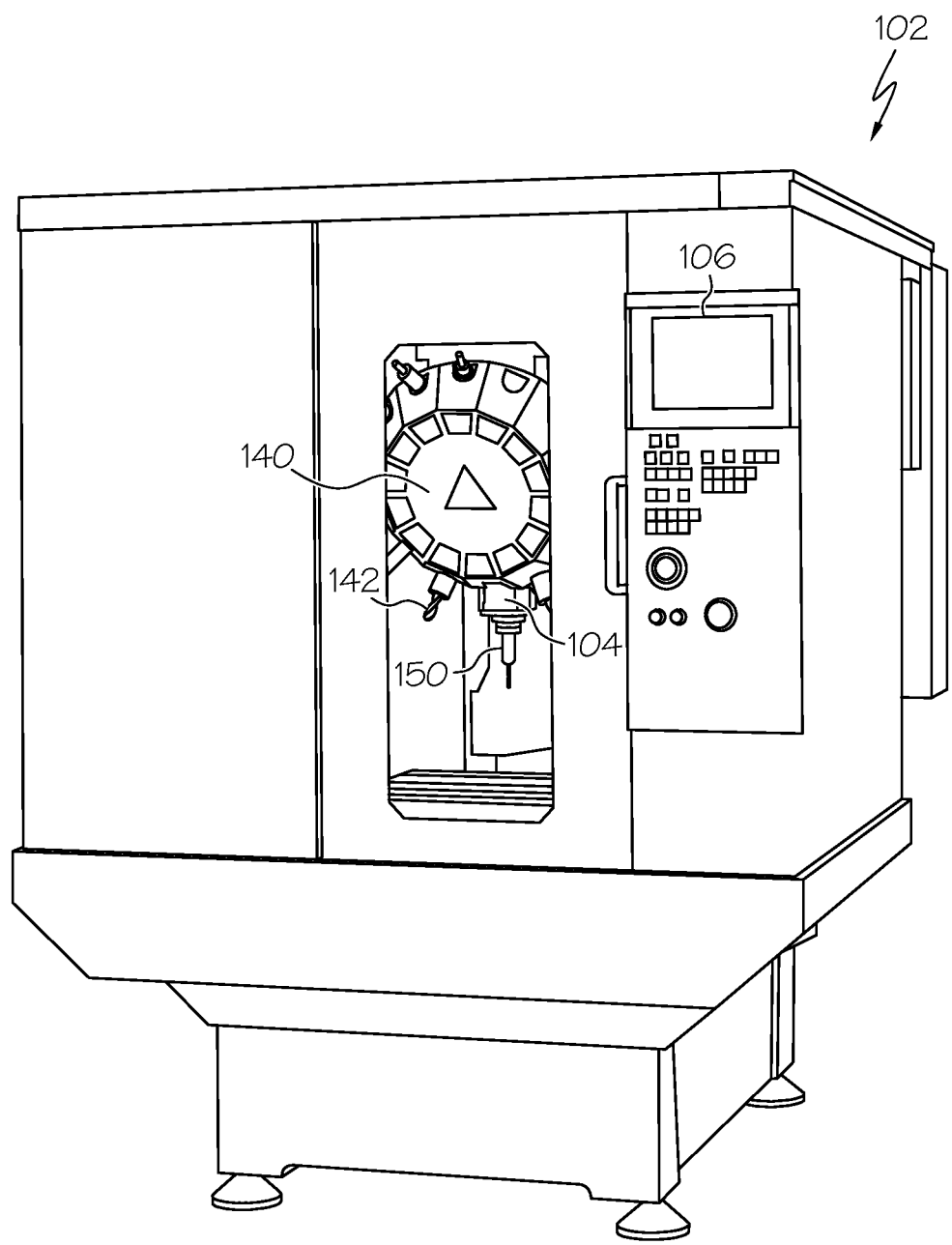
Figure 2:
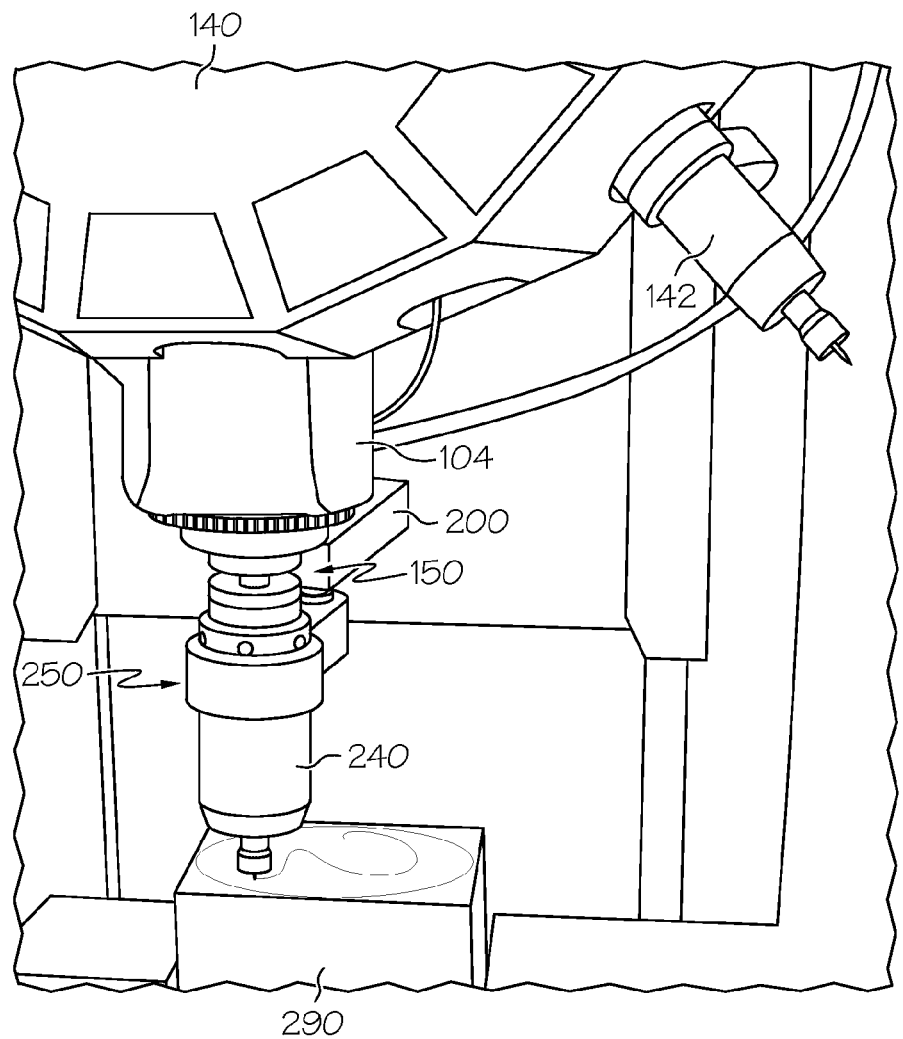
FIG. 2 is a perspective view of another portion of the system of FIG. 1.

Referring to the drawings, and in particular to FIGS. 1-2, a machining system is shown and generally represented by reference numeral 102. System 102 can include a control device 104, such as a CNC machine, a tool carousel 140, and one or more tools or spindles 142. The control device 104 can include a user input device 106 for inputting commands. The control device 104 can utilize various computational hardware and software to implement a machining process on a work piece, and the present disclosure is not intended to be limited based upon the type of control utilized.

The system 102 can also have a universal spindle mounting assembly (USMA) 150 that cooperates with the spindles 142 to allow for automatic exchanging of the spindles with the CNC machine 104. In the exemplary embodiment of system 102, the spindles 142 are exchanged between the CNC machine 104 and the tool carousel 140 by way of an auto changer device, which will be explained later in greater detail. However, the present disclosure contemplates the use of other structures and techniques for connecting and disconnecting the spindles 142 with the CNC machine 104 through use of the USMA 150, such as a linear carousel.

Referring to FIG. 2, the USMA 150 can include a mounting collar assembly 250 and a mounting block or manifold body 200. The mounting collar assembly 250 can be operably coupled to the spindle 240, while the mounting block or manifold body 200 can be operably coupled to the CNC machine 104. A workpiece 290 is shown being machined with system 102.

Figure 3:
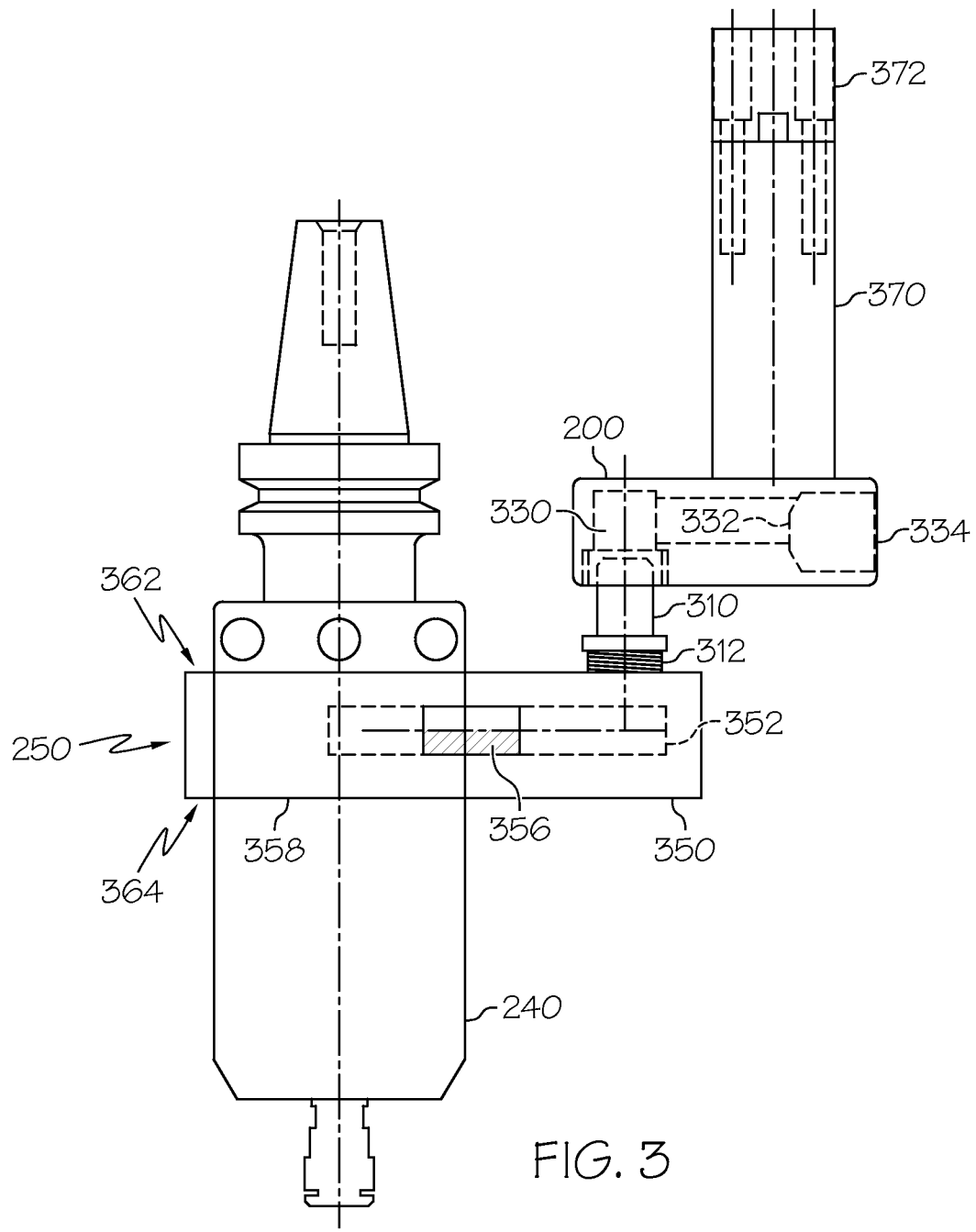
FIG. 3 is a side view of a spindle and mounting collar assembly of the system of FIG. 1.

More specifically, FIG. 3 illustrates the novel mounting assembly 250 with mounting collar 350 attached to the spindle 240. The mounting collar 350 has a top side 362 and a bottom side 364. Mounting collar 350 includes a collar opening 358 which is formed therethrough between the top side 362 and bottom side 364 as shown. The collar opening 358 is sized to accept a portion spindle 240 therethrough as shown. A nipple opening 356 enables fluid communication between the collar opening 358 and passage 352. As described in FIG. 7, a lock screw inside the nipple opening 356 may be used to secure the spindle 240 to the mounting collar 350.

The mounting collar 350 includes a passage 352 in fluid communication between an air inlet assembly 310 and the collar opening 358. The air inlet assembly 310 has a threaded end 312 for inserting into the mounting collar 350. In one example, air inlet assembly 310 includes a spring-loaded check valve that opens above a given pressure to allow liquid, such as air, to flow into the air inlet assembly 310. The use of a check-valve greatly reduces any dirt and undesirable debris from entering the air inlet assembly 310. This is especially important when the mounting collar 350 and spindle 240 are stored in the tool carousel and/or not being used.

The mounting block or manifold body 200 includes an opening 330 for accepting inlet assembly 312. A passage within the mounting block or manifold body 200 to provide fluid communications between the opening 330 to inlet assembly 312 and between opening 334 to opening 330 for system air supply.

An extension bar 370 is mechanically coupled to a mounting plate 372, which is fastened to system 102 holding the entire mounting collar assembly 250 and spindle 240 firmly in place.

Figure 4:
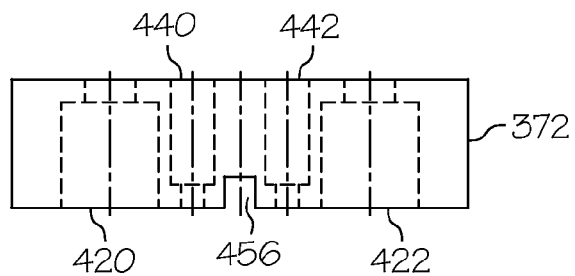
FIG. 4 is a side view of the mounting plate of FIG. 3.
Figure 5:
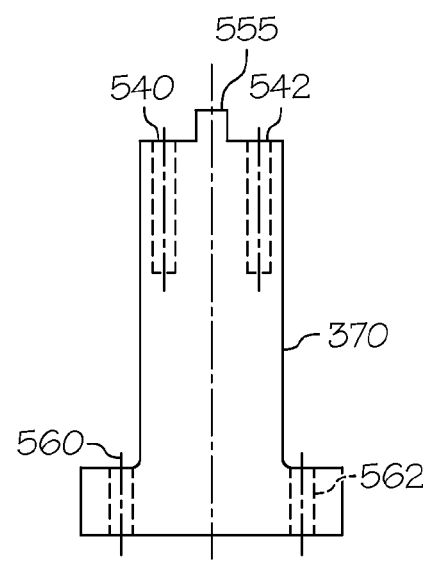
FIG. 5 is a side view of the extension bar of FIG. 3.

Referring additionally to FIGS. 4-5, are side views of the details of the extension bar 370 and mounting plate 372 of FIG. 3. Shown are a set of counterbore openings 420 and 422 for use with fasteners, such as bolts or screws (not shown), to system 102. Also shown are a set of counterbore openings 440, 442 for use with fasteners going into threaded opening 540, 542 of extension bar 370 in FIG. 5. Although the term counterbore is being used, other types of openings including countersinks and straight bores to accommodate other types of fasteners are within the scope of the present invention. A recess 456 in mounting plate 372 is adapted to accept the alignment pin 555 on end of extension arm 370.

Figure 6:
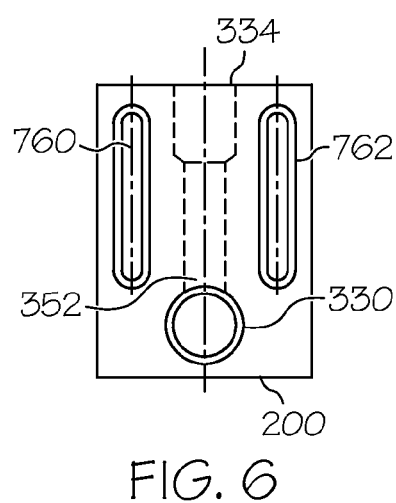
FIG. 6 is a bottom view of the mounting block or manifold body of FIG. 2 and FIG. 3.

FIG. 6 is a bottom view of the mounting block or manifold body shown in FIGS. 2 and 3. Two slotted openings 760, 762 in the mounting block or manifold body 200 are shown to accept and align with the corresponding two openings 560, 562 and to insert fasteners therethrough.

The inventors have discovered the use of extension bar and mounting plate with this fastener configurations provide backward compatibility with existing tool designs. The mounting plate openings 420, 422 align with existing holes in the system typically used for transporting the system 102 and not used during production.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. Therefore, it is intended that the disclosure not be limited to the particular embodiment(s) disclosed as the best mode contemplated for carrying out this invention, but that the invention will include all embodiments falling within the scope of the appended claims.

What is claimed is:

1. An auto changer spindle mounting assembly for mounting a spindle to a computer controlled machining system so that the spindle and a mounting collar can together be selectively exchanged by an automatic changer device, the spindle mounting assembly comprising:

a gas inlet assembly;

the mounting collar defines a collar opening therethrough between a first side of the mounting collar and a second side of the mounting collar, the mounting collar including a side wall with a nipple opening through the side wall, wherein the mounting collar further defines a collar passage in fluid communication between the gas inlet assembly and the collar opening, wherein the collar passage is configured so as to direct fluid through the nipple opening into the collar opening, and a lock screw inside the nipple opening to secure the spindle to the mounting collar;

a manifold body with a gas outlet adapted to mate with the gas inlet assembly of the mounting collar, the manifold body defines a manifold passage in fluid communication between, the gas outlet and a manifold body inlet; and at least one extension bar, adapted to mechanically fasten the manifold body to the computer controlled machining system.

2. The auto changer spindle mounting assembly of claim 1, wherein the extension bar further comprises a mounting plate with one or more openings therethrough adapted to accept fasteners for fastening to the computer controlled machining system.

3. The auto changer spindle mounting assembly of claim 2, wherein the extension bar further comprises one or more threaded openings and the mounting plate includes a corresponding number of openings therethrough adapted to accept fasteners for fastening the mounting plate to the extension bar.

4. A machining system comprising:
a spindle;
a computer controlled machine;
an auto changer device for selectively exchanging the spindle and a collar; and
a mounting assembly including:
  a gas inlet;
  the collar defines a collar opening therethrough between a first side of the collar and a second side of the collar, the collar including a side wall with a nipple opening through the side wall, wherein the collar further defines a collar passage in fluid communication between the gas inlet and the collar opening, wherein the collar passage is configured so as to direct fluid through the nipple opening into the collar opening, and a lock screw inside the nipple opening to secure the spindle to the collar;
  a manifold body with a gas outlet adapted to mate with the gas inlet of the collar, the manifold body defines a manifold passage in fluid communication between, the gas outlet and a manifold body inlet; and
  at least one extension bar, adapted to mechanically fasten the manifold body to the computer controlled machine.

5. The system of claim 4, wherein the extension bar further comprises a mounting plate with one or more openings therethrough adapted to accept fasteners for fastening to the computer controlled machine.

6. The system of claim 5, wherein the extension bar further comprises one or more threaded openings and the mounting plate includes a corresponding number of openings therethrough adapted to accept fasteners for fastening the mounting plate to the extension bar.

* * * * *